United States Patent [19]

Payne

[11] Patent Number: 5,011,636

[45] Date of Patent: Apr. 30, 1991

[54] STRUCTURAL UNIT AND METHOD FOR MOLDING SAME

[76] Inventor: LeRoy Payne, 3300 Nicholas La., Molt, Mont. 59057

[21] Appl. No.: 495,621

[22] Filed: Mar. 19, 1990

Related U.S. Application Data

[60] Continuation-in-part of Ser. No. 271,717, Nov. 19, 1988, Pat. No. 4,909,718, which is a continuation-in-part of Ser. No. 202,267, Jun. 6, 1988, Pat. No. 4,956,135, which is a continuation-in-part of Ser. No. 890,742, Jul. 30, 1986, Pat. No. 4,749,533, which is a division of Ser. No. 766,498, Aug. 19, 1985, Pat. No. 4,671,753.

[51] Int. Cl.$^5$ .................. B29C 41/06; B29C 41/52; B32B 5/20

[52] U.S. Cl. .................. 264/40.7; 52/309.9; 52/589; 264/45.7; 264/311; 425/150; 425/435; 428/33; 428/53; 428/318.8; 428/319.3

[58] Field of Search .............. 425/4 R, 145, 150, 434, 425/435, 817 R, DIG. 241; 264/40.7, 40.1, 45.5, 39, 45.7, 311, 349, DIG. 14, DIG. 17; 249/99, 101; 428/318.8, 310.5, 318.6, 314.2, 33, 53, 319.3; 52/588, 785, 805, 811, 589, 309.8, 309.9

[56] References Cited

U.S. PATENT DOCUMENTS

| | | | |
|---|---|---|---|
| 2,142,305 | 1/1939 | Davis | 52/589 |
| 2,181,451 | 11/1939 | Dow | 52/589 |
| 3,052,927 | 9/1962 | Hoppe et al. | 264/45.5 X |
| 3,679,337 | 7/1972 | Fuselier | 425/435 X |
| 3,843,285 | 10/1974 | Nitta et al. | 425/4 R |
| 3,922,429 | 11/1975 | Welch et al. | 428/318.8 X |
| 4,043,721 | 8/1977 | Lemelson | 425/4 R X |
| 4,051,209 | 9/1977 | Tabler | 264/39 |
| 4,057,607 | 11/1977 | Soehngen et al. | 264/349 X |
| 4,150,074 | 4/1979 | Tilgner | 264/40.7 |
| 4,154,785 | 5/1979 | Inui et al. | 264/45.5 |
| 4,265,972 | 5/1981 | Rudner | 264/45.5 X |
| 4,285,903 | 8/1981 | Lemelson | 264/45.7 X |
| 4,389,177 | 6/1983 | Colby | 425/435 X |
| 4,397,797 | 8/1983 | Nojiri et al. | 264/45.5 |
| 4,560,335 | 12/1985 | Cordova et al. | 425/435 X |
| 4,575,981 | 3/1986 | Porter | 52/309.9 |
| 4,640,150 | 2/1987 | Kobayashi et al. | 264/45.5 X |

FOREIGN PATENT DOCUMENTS

| | | | |
|---|---|---|---|
| 1906276 | 9/1970 | Fed. Rep. of Germany | 264/45.7 |
| 57-208222 | 12/1982 | Japan | 264/45.7 |
| 2034239 | 6/1980 | United Kingdom | 264/45.7 |

*Primary Examiner*—Richard L. Chiesa
*Attorney, Agent, or Firm*—Arthur L. Urban

[57] ABSTRACT

An integrally molded plastic structural unit includes spaced support members joined by a web section disposed therebetween, each of the support members including spaced face sections and an intermediate section therebetween. Each face section includes a stressed hard outer skin. The intermediate section includes a peripheral frame section of high density. The web section includes high density connector members extending between adjoining face sections of the spaced support members. Each of the support members includes mateable sections along at least two edges thereof, with each of the mateable sections including at least five alternating raised and recessed areas forming an asymmetrical pattern along the length of each mateable section. The pattern is the same or a reverse pattern thereof along each mateable section of the same unit and of adjacent units with which it will be assembled. The mateable sections extend beyond the face members or are recessed below the face members on the edges of the unit a substantially equal distance. Also, a method of molding the structural unit.

30 Claims, 1 Drawing Sheet

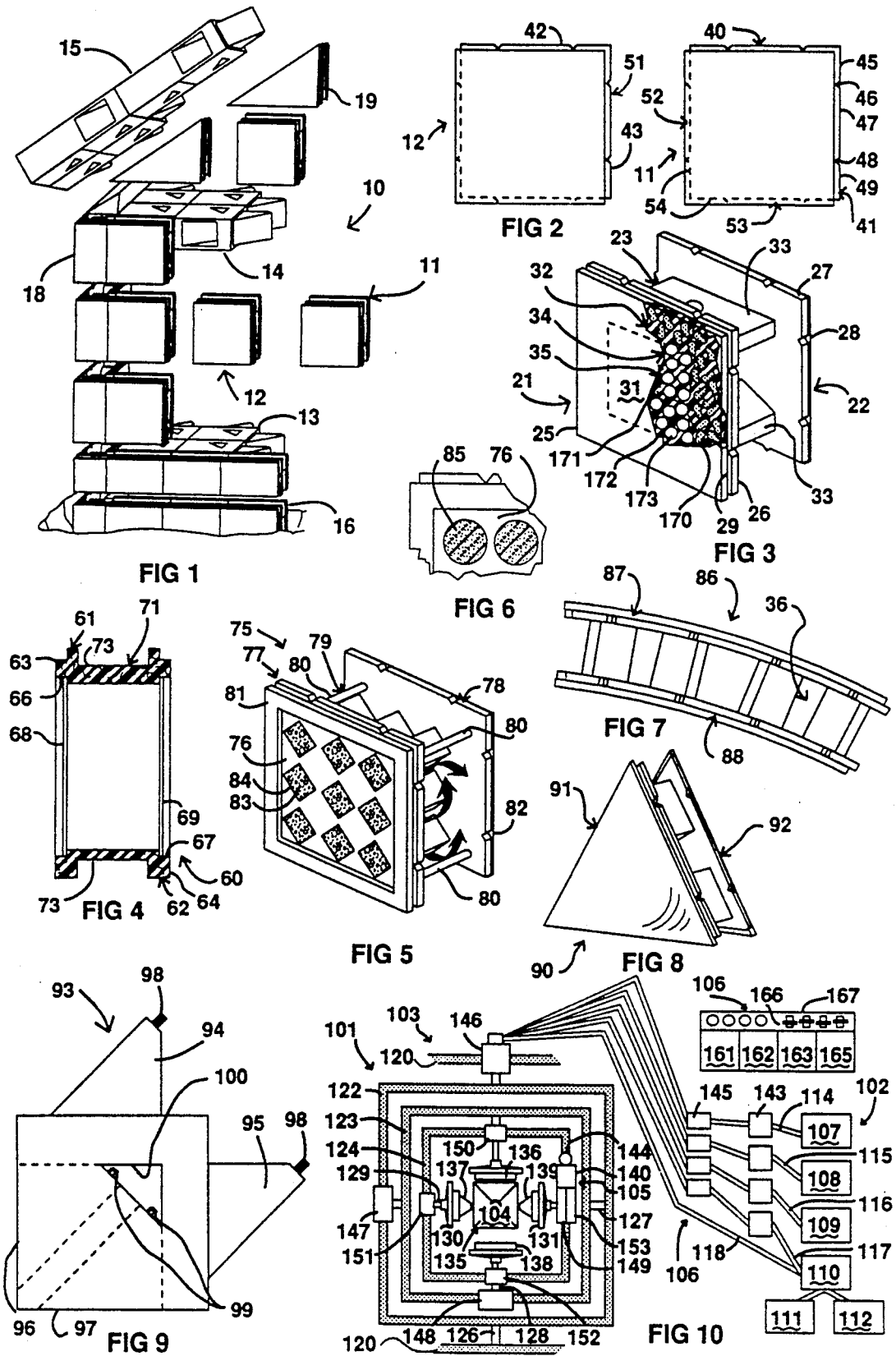

STRUCTURAL UNIT AND METHOD FOR MOLDING SAME

This application is a continuation-in-part of pending application Ser. No. 271,717, filed Nov. 16, 1988, now U.S. Pat. No. 4,909,718, which in turn is a continuation-in-part of pending application Ser. No. 202,267, filed Jun. 6, 1988, now U.S. Pat. No. 4,956,135, which in turn is a continuation-in-part of application Ser. No. 890,742, filed Jul. 30, 1986, now U.S. Pat. No. 4,749,533, which is a division of application Ser. No. 766,498, filed Aug. 19, 1985, now U.S. Pat. No. 4,671,753.

This invention relates to a novel molded product and to a new molding method for producing same.

Throughout history, an important activity has been the construction of buildings for various purposes such as dwellings, storage and the like. With primitive societies, it was common to construct such buildings from natural materials that were readily available. In forested areas, structures were erected with logs or boards that had been cut from the logs.

Where trees were less common, people used stone for building materials or artificial adobe substitutes formed from mud baked in the sun. To make artificial stones or bricks more durable and less likely to crumble, it was customary to mix straw or similar materials with the mud. The building components ordinarily were fabricated and/or prepared at the building site.

Even today, most building construction is performed at the building site using components and materials trucked to the site from other locations. Little fabrication is done away from the site at sawmills, brickyards, etc. and only a few special components such as windows are assembled in advance.

Conventional building methods require that a large number of different craftsmen do their work at the construction site. Thus, the quality of the finished building depends upon the ability of the craftsmen to perform their tasks properly under the conditions and distractions generated by the activities of the many other workmen on the site at the same time.

Efforts have been directed to the use of prefabricated modules produced at central locations and trucked to the building site for assembly. However, this type of construction has gained only limited acceptance because of the lack of flexibility in building designs, the module size limitations and the high cost of transporting modules over the highways.

To overcome the shortcomings of traditional construction procedures, the renowned architect, Frank Lloyd Wright and his associates, more than a half century ago, pioneered Usonian block houses fabricated with cast hollow concrete blocks. The blocks are formed with grooves around their edges so they can be interconnected with mortar and steel reinforcing bars like giant children's building blocks. The interconnected blocks can be used to span openings, contain utility services, accommodate glass, doors and the like. This building system enables an owner and/or a small crew to construct a high quality building without an army of special craftsmen such as masons, carpenters, etc.

The blocks can be fabricated at the building site in simple molds. The block system is based on modular units generally two to four feet in width. Great care must be exercised in the assembly of the blocks to ensure that the joints follow the module dimensions. Any cumulative incremental error eventually may disrupt the modular structure. Thus, the dimensions of the individual blocks have to be maintained within very close tolerances which is difficult to achieve with the inherent shrinkage that occurs during the molding of the blocks and the curing thereof with time.

From a practical viewpoint, the collection of a sufficiently large number of blocks of exactly the same dimensions for an entire building including the roof, walls, floors and partitions is a formidable task. One must be willing to make a much larger number of blocks than needed and then inspect each carefully, discarding the many blocks that do not meet specifications.

Even when tolerable dimensional reproducability is achieved, the high strength and structural uniformity required for building quality, durability and integrity still must be attained.

In view of the above discussion, it is clear that previous building methods and procedures do not provide the design possibilities and construction efficiencies required currently and in the future. Thus, there is a need for a new structural unit and molding and assembly procedures that overcome the shortcomings of earlier techniques.

The present invention provides a novel structural unit and molding and assembly procedures therefor that not only overcome the deficiencies of previous expedients but also provide features and advantages not found in such earlier endeavors. The structural unit of the invention has a high level of strength and other physical properties as well as uniformity and quality of structure. Also, the structural unit meets dimensional and structural specifications easily. In addition, the invention simplifies the providing of utility services and their use.

The molding method of the present invention provides continuous high volume production of structural units of the invention with a minimum of rejects. The method of the invention can be used efficiently by individuals and/or a small work crew after a short period of instruction.

The apparatus for molding the structural unit of the invention is simple in design and can be produced relatively inexpensively. Commercially available materials and components and conventional metal fabricating techniques can be utilized in manufacturing the apparatus.

The molding method and apparatus can be modified to mold a wide variety of different structural units of the invention. Thus, foundation units, wall units, window units, corner units, floor units, ceiling units, roof units, beam units, solar units and the like can be molded successfully with the method and apparatus of the invention.

Variations in configuration, function, structure, composition, etc. can be attained simply and quickly with the method of the invention. Even with such variations, uniformity of dimensions, composition and quality can be maintained without difficulty.

Structural units of the present invention can be assembled to form buildings of many different designs easily and conveniently. The structural units can be assembled and locked together without special skills and tools by one or a few persons. The novel interlocking means and the dimensional uniformity of the structural units enables them to be assembled in modules precisely without mortar and without continuous checking of alignment and orientation as each unit is added.

Subsequent modification or alteration can be made to the building if desired. The building also can be dismantled and reconstructed at a different site.

BRIEF DESCRIPTION OF THE DRAWINGS

These and other benefits and advantages of the novel structural unit, assembly method and molding method for producing same of the present invention will be apparent from the following description and the accompanying drawings in which:

FIG. 1 is a fragmentary view in perspective of a building constructed with one form of structural units of the invention with units separated;

FIG. 2 is an enlarged side view of two structural wall units shown in FIG. 1 prior to assembly;

FIG. 3 is an enlarged view in perspective partially in section of a wall unit of the invention;

FIG. 4 is a side view in section of another form of structural unit of the invention;

FIG. 5 is a view in perspective of a further form of structural unit of the invention;

FIG. 6 is a fragmentary front view of an additional form of structural unit of the invention;

FIG. 7 is a side view of another form of structural unit of the invention;

FIG. 8 is a view in perspective of a further form of structural unit of the invention;

FIG. 9 is a front view of an additional form of the structural unit of the invention; and FIG. 10 is a schematic sectional view of one form of molding apparatus for molding a structural unit of the invention.

DESCRIPTION OF THE PREFERRED EMBODIMENTS

As shown in the drawings, a building 10 is constructed with a plurality of molded plastic structural units 11-19. Structural unit 11 is shown as a wall unit. Other units of similar flat configuration are shown as floor unit 13, ceiling unit 14, roof unit 15 and foundation unit 16. Corner units 18 also are similar to two wall units disposed at a right angle and are integrally formed as a unitary structure. In the eaves of the building, assemblies of wall units 11 and triangle units 19 are employed.

Each of the structural units 11-19 includes spaced support members 21 and 22 joined by a web section 23 that is disposed between the support members. Each support member 21 and 22 includes spaced face sections 25, 26 and 27, 28 respectively and an intermediate section 29 therebetween. Each face section 25-28 includes a stressed skin hard outer skin 31.

The intermediate section 29 of each support member 21, 22 includes a peripheral frame section 32 of high density. The web section 23 of each structural unit includes high density connector members 33. The connector members extend between adjoining face sections 26 and 27 of the spaced support members.

The support members 21 and 22 of the structural units 11-19 of the invention advantageously are disposed substantially parallel to one another. Preferably, the spacing between the support members is substantially less than the largest dimension of the support members. The support members advantageously are substantially flat although as will be described hereinafter and shown in the drawings, other configurations may be utilized. The support members preferably are of geometric configurations such as quadrangles, triangles, etc.

Advantageously, the peripheral frame section 32 of the intermediate section 29 of the structural unit is symmetrical from one side of the intermediate section to the other. In some applications such as wall units adjoining doors, windows, etc., it may be desirable that the frame section be asymmetrical from one side to the other to provide greater strength and stability at an edge or opening. Usually, the cross section of the frame section is substantially the same throughout its length. The frame section preferably has a high density approximating that of the face sections of the support members.

Area 34 of the intermediate section 29 not occupied by the peripheral frame section 32 may be a sealed open area filled with air or another gas. Also, area 34 may be filled with an insulating foam 35, which advantageously is of lesser density than the frame section.

More advantageously, the area 34 circumscribed by the frame section is receptive to environmental conditions such as light, temperature and the like. For example, the area may be capable of transmitting light such as a transparent or translucent panel. If desired, corresponding areas may be present in both support members of a single unit. Also, the area may be utilized to provide solar heating, cooling and the like as will be described hereinafter.

The high density connector members 33 that extend between adjoining face sections 25, 26 and 27, 28 advantageously are disposed at an angle to the support members. The connector members may be plates, rods and similar structural components. Preferably, the connector members form a network between the support members. Ordinarily, at least one passage 36 through the structural unit is created in the remaining space between the support members.

The support members 21 and 22 of the structural unit of the invention also include mateable sections 40 and 41 along at least two edges 42 and 43 respectively of the structural unit 11. Each of the mateable sections 40, 41 includes at least five alternating raised and recessed areas 45-49. The alternating raised areas 45, 47 and 49 and recessed areas 46 and 48 form an asymmetrical pattern along the length of each mateable section. The asymmetrical pattern is the same or a reverse thereof along each mateable section of the same unit and other units with which it is assembled.

As shown in FIG. 2, structural unit 11 has a mateable section along each of its four edges. Thus, mateable sections 40 and 41 of unit 11 include patterns 51 that extend outwardly beyond two edges of the support members while mateable sections 52 and 53 include reverse patterns 54 that are recessed below the other edges of the support members.

This arrangement of the mateable sections 40, 41, 52 and 53 around the periphery of unit 11 enables the unit to be assembled with other units, each of which includes at least two of the same asymmetrical patterns along the mateable sections thereof. In FIG. 2, unit 11 is joined with structural unit 12 by inserting exposed raised mateable section 40 into recessed mateable section 52 of unit 12. Since the mateable patterns are asymmetrical, the units can only be joined in an orientation which the building designer has selected in advance. In the same way, other units can be joined to units 11 and 12.

Since the units are molded within very close tolerances, joining the units through the mateable sections provides automatic alignment and orientation of one unit to the next. Thus, joining wall units 11, 12 with similar units provides a straight true wall assembly with a high level of strength and structural integrity. To facilitate positive interlocking of adjoining units, it is advantageous to include at least one passage through the mateable sections into which a pin may be inserted.

FIG. 1 shows how other units 13-19 are joined together with units 11 and 12. Each interconnection is achieved through the same mechanism with mateable sections of one unit being inserted into mateable sections of another unit. Where a change in direction is required, the units will include mateable sections that are oriented perpendicular to the main plane of the particular unit such as floor units 13, ceiling units 14 and roof units 15. Also, wall units with perpendicular mateable sections facilitate the interconnection of perpendicular walls therewith.

As described above, the structural units of the present invention may be of a number of different configurations. Advantageously, for walls, floors, ceilings, roofs, etc., the support members of the units generally include substantially quandrangular, e.g. square or rectangular, face portions to establish the desired modular design of the building. The corner units 18 include intersecting support members. The thickness of the units may vary and preferably is substantially less than the largest dimension of the face portions.

For precise alignment of assembled units, the depths of the recessed mateable sections 52, 53 below the face section edges are at least substantially equal and advantageously are slightly greater than the heights of the raised mateable sections 40, 41 engageable therewith beyond the face section edges. This relationship insures that the combined face section edges of adjacent units will be in full contact and bear against each other.

Also, such a structural relationship preferably provides space for the placement of a compressible ribbon 55 between the mating patterns, 51, 54 of the respective units. The use of such a ribbon not only provides a seal against air leakage, but also provides a seal against air leakage, but also provides for safe flexural movement between the assembled units. As a result, forces such as earthquakes and the like that ordinarily would cause extensive damage or complete destruction of conventional buildings, can be absorbed safely by buildings of the invention.

Units may be assembled with the openings therein extending perpendicular to the length of a wall, etc. or following the length of the wall as desired. In foundation units, vertically arranged passages may be filled with concrete alone or with reinforcing rods, etc. Continuous passages through assembled units may serve as conduits for plumbing, electrical wiring, heating system ducts, etc. or simply be filled with insulation.

As pointed out above, the support member area 34 circumscribed by the frame section 32 of the structural unit of the invention advantageously is receptive to an environmental condition. For example, as shown in FIG. 4, a structural unit 60 includes support members 61 and 62 each of which includes a frame section 63 and 64 respectively. Central areas 66 and 67 within the frame sections include transparent panels 68 and 69 integrally formed during the molding of the structural unit. The web section 71 includes a plurality of plate members 73 that seal the space between the transparent panels. This structural unit 60 can function as a double glazed window unit.

A similar structural unit 75 shown in FIG. 5 includes a transparent panel 76 in only one support member 77 with a solid support member 78 spaced therefrom. Web section 79 includes spaced rod members 80 extending between frame sections 81 and 82 of the respective support members. Unit 75 may be utilized as a solar unit through which air is circulated when the sun is shining. If desired, heat sink chambers 83 can be created with connector plates 84 which may be filled with a heat storing material such as gravel.

In place of the heat sink chambers a plurality of photo-voltaic cells 85 (FIG. 6) may be positioned under the transparent panel to generate electricity. The electricity can be collected in storage batteries (not shown).

FIG. 7 illustrates an arcuate structural unit 86 which can be utilized with similar units to form a roof or ceiling with a hemi-cylindrical configuration. Unit 86 is similar in structure to flat units of the invention with the exception that the support members 87 and 88 have an arcuate configuration.

To construct a domed roof or ceiling or a complete dome structure, structural unit 90 which is shaped as a portion of a sphere is employed as shown in FIG. 8. Support members 91 and 92 may include triangular face sections which are portions of a sphere.

FIG. 9 illustrates a roof, ceiling or floor unit 93 with spaced projections 94, 95. The unit also includes spaced passages 96, 97 accepting the projections of other units to which unit 93 is joined. Advantageously, the free ends of the projections include threaded sections 98 to which suitable fasteners 99 can be secured through openings 100. In this way, the units can be locked together to increase the strength and structural integrity of a roof, floor, or other bridging components of a building.

One form of continuous molding apparatus 101 for molding the structural units 11-19 described above includes a raw material supplying portion 102, a supporting portion 103, a molding portion 104, a mixing portion 105 and a control portion 106 as shown in FIG. 10 of the drawings.

The raw material supplying portion 102 of the molding apparatus 101 includes a plurality of reservoirs 107, 108, 109, 110, 111 and 112. These reservoirs may include storage chambers for resin-forming materials, fillers, reinforcements, colors, catalysts, foam-forming materials, other additives, inert mixtures thereof and the like. Reservoirs 111 and 112 are connected with reservoir 110 for premixing of inert materials therein prior to transfer to the mixing portion.

Reservoirs 107-110 of the raw material supplying portion 102 are independently connected to the mixing portion 105 through conduit means 114, 115, 116 and 117. Advantageously, separate bypass return conduit means 118 (one of which is shown in the drawings) extend from one end of each conduit adjacent the mixing portion 105 back to the respective reservoir as illustrated.

The supporting portion 103 of apparatus 11 of the present invention includes generally parallel upstanding end sections 120 and 121. A plurality of frame members 122, 123 and 124, each with a large open central area extends between the upstanding end sections and is rotatably supported thereon. Each of the inner frame members 123 and 124 is progressively smaller in size and is disposed within an open central area of the next larger frame member.

Alternate frame members shown in the drawings as members 122 and 124 are rotatable about aligned axes 126 and 128. The frame member 123 therebetween is rotatable about an axis 127 generally perpendicular to the first axes 126 and 128. The smallest frame member 124 includes rotatable mold supports 130 and 131 that extend inwardly along an axis 129 that also is perpendicular to axis 128 of that frame member. The smaller frame members 123, 124 are generally centered within the open central area of the next larger frame members 122 and 123 respectively.

The molding portion 104 of the molding apparatus 11 includes a mold assembly 135. The mold assembly includes separable mold sections shown as mold sections 136, 137, 138 and 139.

The mixing portion 105 of the molding apparatus 101 preferably includes an elongated mixing chamber 140 disposed adjacent mold assembly 135. A plurality of deflector sections (not shown) are disposed within the mixing chamber and spaced along the length thereof.

The control portion 106 of the molding apparatus 11 of the present invention includes a plurality of pumps, valves, sensors, monitors and the like. Advantageously, a pump 143, a valve 144 and a flow monitor 145 are located along the length of each conduit 114-117 that extends between the raw material reservoirs 107-110 and the mixing chamber 140.

Also, the control portion includes a plurality of drive means. Drives 146, 147, 148 provide independent rotation of each frame section 122, 123 and 124 respectively. Drive 149 provides rotation of the mold supports 130, 131. Drives 150, 151, 152 and 153 provide separation of the mold sections 136, 137, 138 and 139.

The control portion 106 further includes programmable memory means 161 and actuating means 162 responsive thereto, advantageously in combination with coordinating means 163, to control the operation of the pumps, valves and drives.

Advantageously, the coordinating means 163 includes a process controller 165 that initiates changes in the flows of materials and speeds of drives to bring variations therein back to the rates specified in the programs present in the memory 161. This coordination commonly is achieved through the transmission of information such as digital pulses from the monitors and/or sensors at the control components to the process controller. The operating information is compared with the preselected programming parameters stored in the memory. If differences are detected, instructions from the controller change the operation of the components to restore the molding operation to the preselected processing specifications.

Novel molded structural units of the present invention may be formed using the molding apparatus 101 shown in the drawings employing the following steps of the molding method of the invention. With the design of the desired unit and the location of the mateable sections thereof established, the control portion 106 including memory 161 which may be a computer, is programmed with the necessary processing parameters for the particular product being molded.

To start the operation of the molding apparatus 101, buttons and/or switches 166 of a control panel 167 are depressed to activate the memory 161 and the other components of the control portion 106. The coordinating means 163 energizes drives 150-153 to lock the mold sections together and the drives 146-148 for rotation of each frame section 122-124.

Also, the pumps 143, the valves 144 and the flow monitors 145 are energized by the coordinating means 163 in the preselected sequences of the program stored in the memory. This causes the raw materials in reservoirs 107-110 to advance along the conduits 114-117 toward the mixing portion 105. For example, to mold a product including a foamed polyurethane resin, reservoir 110 may contain a previously prepared mixture of an isocyanate and gravel as a filler, reservoir 107 a polyol, 108 foam forming materials and 109 and other reservoirs (not shown)—colors, catalysts, etc. as required.

For the production of a high quality molded structural unit of the invention, it is important that the raw materials delivered to the mixing chamber be uniform in volume and composition. This can be facilitated by providing a continuous flow of raw materials to the mixing portion 105 and the immediate transfer of the mixture therefrom into the mold cavities. However, the volume of the mixture delivered into the mold cavity will vary depending upon the particular incremental area of the cavity being coated at any instant. Also, the delivery will be terminated completely when a molded product is being removed from the mold assembly 135.

Advantageously, as shown in FIG. 1, a separate bypass conduit 118 is utilized from the end of each conduit 114-117 at a point adjacent the mixing chamber 140 back to the respective reservoir 107-110. This construction provides a freshly formed uniform mixture into the mold cavity even though the distance is considerable between the reservoirs and the mixing chamber which is located closely adjacent or even within the mold assembly 135.

The control portion 106 coordinates the operation of the various system components so the required formulation can flow into the desired zones within the rotating mold cavity. After the desired volume of the mixture has passed into the mold cavity, rotation of the frame sections 122-124 is continued to flow the mixture over all surfaces of the mold cavity in a preselected and monitored rotational profile.

The rotations are controlled within the parameters stored in the memory 161. For particular structural units, the rotations about the respective axes may be continuous and/or intermittent at changing rates. Also, it may be desirable to provide arcuate rotation, that is, movement about an arch such as a rocking motion.

The components of the liquid mixture that flow into the mold cavity quickly begin to react to form a thermosetting resin structure while rotational movement of the mold assembly 135 continues about several axes. The mixture initially spread over the mold interior forms a resin structure with a high density and with little or no bubble formation. This dense structure includes primary structural components of the structural unit, that is, face sections 25-28, frame section 32 and connector members 33 and usually a thin shell of other portions of the unit being molded. It is customary, however, to add to the mold cavity a second formulation that includes a significant proportion of a foam-forming ingredient to form a less dense resin foam within the remaining areas of the unit.

To provide structural units of the invention which are receptive to environmental conditions, transparent and translucent panels and other components can be formed during the molding either prior to, simultaneously with or subsequent to the formation of the primary structural components discussed above.

When all of the desired components have been molded, rotation of the mold assembly 135 is stopped and the mold sections 136-139 separated to free the molded unit therefrom. The separated molded structural unit is set aside to complete the foam formation and/or the curing of the resin therein. During this period, the final expansion of the foam, free of the mold's restraint, stresses the high density outer skin or layer of the unit. This stressing of the skin increases the strength and puncture resistance thereof and also the structural strength of the molded product itself. The structural strength of the unit can be enhanced further by including a reinforcement such as metal or fiberglass fibers in the mixture prior to molding. Also, preformed reinforcements such as metal rods can be positioned in the mold cavity before the mold sections are closed.

FIG. 3 illustrates a fragmentary section of a structural unit of the invention produced employing the molding method and apparatus described above. As shown, unit 11 includes support members 21 and 22 including high density stressed skin face sections 25 and 27. Frame section 32 within support member 21 includes crushed stone filler particles 170 and fiber reinforcements 171 distributed within a resin matrix 172. Area 34 circumscribed by frame section 32 includes a resin foam including gas bubbles 173 together with a few fiber reinforcements 171 and filler particles 170 distributed within resin matrix 172.

The above description and the accompanying drawings show that the present invention provides a novel structural unit and a method for molding the units which not only overcome the deficiencies and shortcomings of earlier expedients, but also provide features and advantages not found in previous products. The structural unit of the invention has superior strength and other physical properties. The unit is of high quality and uniformity of dimensions and composition.

The novel structure of the unit provides a higher strength to weight ratio permitting the production of larger units that still can be lifted by one person and thereby increasing the productivity. Also, the superior structure permits the inclusion of special functional elements within the unit without sacrificing structural properties.

Structural units of the invention can be assembled to form buildings of many different designs easily and conveniently without special skills or tools by one person or a small crew. The novel interlocking means and the dimensional uniformity of the structural units permits them to be assembled precisely and accurately without mortar and without having to check alignment as each unit is added. Buildings can be modified or dismantled and reassembled if desired.

Variations in structure and composition of the units can be made with the apparatus and method of the invention simply and quickly without sacrificing quality and dimensional uniformity.

It will be apparent that various modifications can be made in the particular structural unit and the method of molding same described in detail above and shown in the drawings within the scope of the present invention. The size and configuration of the units can be changed to meet specific requirements. Also, the number and quantities of constituents in the moldable mixture can be different. In addition, other mateable section pattern configurations can be utilized. If desired, decorative designs can be incorporated into the face sections during molding.

These and other changes can be made in the structural unit and the method of molding provided the function and operation thereof are not adversely affected. Therefore, the scope of the present invention is to be limited only by the following claims.

What is claimed is:

1. An integrally molded plastic structural unit including spaced support members joined by a web section disposed therebetween, each of said support members including spaced face sections and an intermediate section therebetween, each face section including a stressed hard outer skin, said intermediate section including a peripheral frame section of high density, said web section including high density connector members extending between adjoining face sections of said spaced support members, each of said support members including mateable sections along at least two edges thereof, each of said mateable sections including at least five alternating raised and recessed areas forming an asymmetrical pattern along the length of each mateable section, the pattern being the same or a reverse pattern thereof along each mateable section of the same unit and of adjacent units with which it will be assembled, said mateable sections extending beyond said face sections or being recessed below said face sections on said edges of said unit a substantially equal distance; whereby adjacent units are interconnected by engaging a recessed mateable section of one unit with a raised mateable section of an adjacent unit or vice versa.

2. An integrally molded plastic structural unit according to claim 1 wherein said spaced support members are disposed substantially parallel to one another.

3. An integrally molded plastic structural unit according to claim 1 wherein said spacing between said support members is substantially less than the largest dimension of said support members.

4. An integrally molded plastic structural unit according to claim 1 wherein said support members are substantially flat.

5. An integrally molded plastic structural unit according to claim 1 wherein said support members are arcuate.

6. An integrally molded plastic structural unit according to claim 1 wherein said support members are portions of a sphere.

7. An integrally molded plastic structural unit according to claim 1 wherein said support members are quadrangular.

8. An integrally molded plastic structural unit according to claim 1 wherein said support members are triangular.

9. An integrally molded plastic structural unit according to claim 1 wherein said peripheral frame section of said intermediate section is symmetrical from one side of said intermediate section to the other.

10. An integrally molded plastic structural unit according to claim 1 wherein said peripheral frame section of said intermediate section is asymmetrical from one side of said intermediate section to the other.

11. An integrally molded plastic structural unit according to claim 1 wherein said peripheral frame section of said intermediate section has substantially the same cross section throughout its length.

12. An integrally molded plastic structural unit according to claim 1 wherein said peripheral frame section is of a high density approximating that of said face sections of said support members.

13. An integrally molded plastic structural unit according to claim 1 wherein said peripheral frame section circumscribes an area receptive to environmental conditions.

14. An integrally molded plastic structural unit according to claim 13 wherein said area receptive to environmental conditions is receptive to light.

15. An integrally molded plastic structural unit according to claim 13 wherein said area receptive to environmental conditions is receptive to temperature.

16. An integrally molded plastic structural unit according to claim 13 wherein said area receptive to environmental conditions is capable of transmitting light.

17. An integrally molded plastic structural unit according to claim 13 wherein corresponding areas receptive to environmental conditions are present in both of said support members.

18. An integrally molded plastic structural unit according to claim 1 wherein said area circumscribed by said frame section is of lesser density than said frame section.

19. An integrally molded plastic structural unit according to claim 18 wherein said lesser density area includes a resin foam.

20. An integrally molded plastic structural unit according to claim 1 wherein said web section includes connector members disposed at an angle to said support members.

21. An integrally molded plastic structural unit according to claim 1 wherein said connector members include rods.

22. An integrally molded plastic structural unit according to claim 1 wherein said connector members include plates.

23. An integrally molded plastic structural unit according to claim 1 wherein said connector members form a network between said support members.

24. An integrally molded plastic structural unit according to claim 1 wherein said unit includes at least one passage therethrough in the space between said support members.

25. An integrally molded plastic structural unit according to claim 1 including projections and passages of a size accepting said projections, both of which are disposed in a plane substantially parallel to said support members.

26. An integrally molded plastic structural unit according to claim 25 wherein free ends of said projections include threaded sections.

27. An integrally molded plastic structural unit according to claim 1 wherein said structural unit includes a major proportion of a particulate filler.

28. An integrally molded plastic structural unit according to claim 1 wherein said structural unit includes a thermosetting resin.

29. An integrally molded plastic structural unit according to claim 1 wherein said structural unit includes a reinforcing material.

30. A continuous method of molding a structural unit including the steps of continuously advancing raw materials from a plurality of reservoirs independently to a mixing chamber located closely adjacent to a mold assembly including separable mold sections, introducing said raw materials into said mixing chamber, passing a freshly formed mixture flowing from said mixing chamber directly into a cavity of said adjacent mold assembly in a preselected and monitored flow rate profile, rotating said mold assembly about at least three intersecting axes in a preselected and monitored rotational profile, initially flowing said mixture over surfaces of said mold cavity by said rotational movement to form a hard skin surface, flowing additional quantities of said mixture to peripheral edges of said mold cavity, forming therewith an integral high density peripheral frame section, monitoring and coordinating in a preselected profile the delivery of raw materials to said mixing chamber, the resulting mixture flowing therefrom and the multiple axis rotation of said mold assembly, separating said mold sections of said mold assembly after said unit has formed said mold cavity, removing a molded unit from said separated mold sections, closing said mold sections and repeating said steps to form a multiplicity of such molded units on a continuing basis.

* * * * *